(12) United States Patent
Saleh et al.

(10) Patent No.: US 11,238,640 B2
(45) Date of Patent: Feb. 1, 2022

(54) EARLY CULLING FOR RAY TRACING

(71) Applicant: Advanced Micro Devices, Inc., Santa Clara, CA (US)

(72) Inventors: Skyler Jonathon Saleh, San Diego, CA (US); Sagar S. Bhandare, San Diego, CA (US); Fataneh F. Ghodrat, Boxborough, MA (US); Paul Raymond Vella, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/008,462

(22) Filed: Aug. 31, 2020

(65) Prior Publication Data

US 2021/0407175 A1  Dec. 30, 2021

Related U.S. Application Data

(60) Provisional application No. 63/044,686, filed on Jun. 26, 2020.

(51) Int. Cl.
*G06T 15/06* (2011.01)
*G06T 15/40* (2011.01)

(52) U.S. Cl.
CPC .............. *G06T 15/06* (2013.01); *G06T 15/40* (2013.01); *G06T 2210/21* (2013.01)

(58) Field of Classification Search
CPC ...... G06T 15/06; G06T 15/40; G06T 2210/21
See application file for complete search history.

(56) References Cited

U.S. PATENT DOCUMENTS

| | | | |
|---|---|---|---|
| 2008/0024489 A1* | 1/2008 | Shearer | G06T 15/06 345/421 |
| 2008/0074420 A1 | 3/2008 | Kuesel et al. | |
| 2009/0284523 A1 | 11/2009 | Peterson et al. | |
| 2010/0077010 A1* | 3/2010 | Aila | G06T 17/005 707/803 |
| 2011/0285710 A1 | 11/2011 | Mejdrich et al. | |
| 2013/0328857 A1* | 12/2013 | Burley | G06T 15/06 345/418 |
| 2016/0071310 A1* | 3/2016 | Karras | G06T 1/60 345/426 |
| 2017/0270146 A1 | 9/2017 | Harrison et al. | |
| 2019/0057539 A1* | 2/2019 | Stanard | G06T 17/005 |
| 2020/0043218 A1* | 2/2020 | Vaidyanathan | G06T 15/80 |
| 2020/0051316 A1* | 2/2020 | Laine | G06T 15/06 |

\* cited by examiner

*Primary Examiner* — Daniel F Hajnik
(74) *Attorney, Agent, or Firm* — Volpe Koenig

(57) ABSTRACT

A technique for performing ray tracing operations is provided. The technique includes reading descendant-shared type metadata for a non-leaf node of a bounding volume hierarchy; identifying one or more culling types for a ray-intersection test for a ray; and determining whether to treat the non-leaf node as not intersected based on whether the one or more culling types includes at least one type specified by the descendant-shared type metadata.

20 Claims, 8 Drawing Sheets

EARLY CULLING FOR RAY TRACING

CROSS-REFERENCE TO RELATED APPLICATIONS

This application claims the benefit of U.S. Provisional application No. 63/044,686, entitled "EARLY CULLING FOR RAY TRACING," filed on Jun. 26, 2020, the entirety of which is hereby incorporated herein by reference.

BACKGROUND

Ray tracing is a type of graphics rendering technique in which simulated rays of light are cast to test for object intersection and pixels are colored based on the result of the ray cast. Ray tracing is computationally more expensive than rasterization-based techniques, but produces more physically accurate results. Improvements in ray tracing operations are constantly being made.

BRIEF DESCRIPTION OF THE DRAWINGS

A more detailed understanding may be had from the following description, given by way of example in conjunction with the accompanying drawings wherein.

DETAILED DESCRIPTION

A technique for performing ray tracing operations is provided. The technique includes reading descendant-shared type metadata for a non-leaf node of a bounding volume hierarchy; identifying one or more culling types for a ray-intersection test for a ray; and determining whether to treat the non-leaf node as not intersected based on whether the one or more culling types includes at least one type specified by the descendant-shared type metadata.

Figure 1:
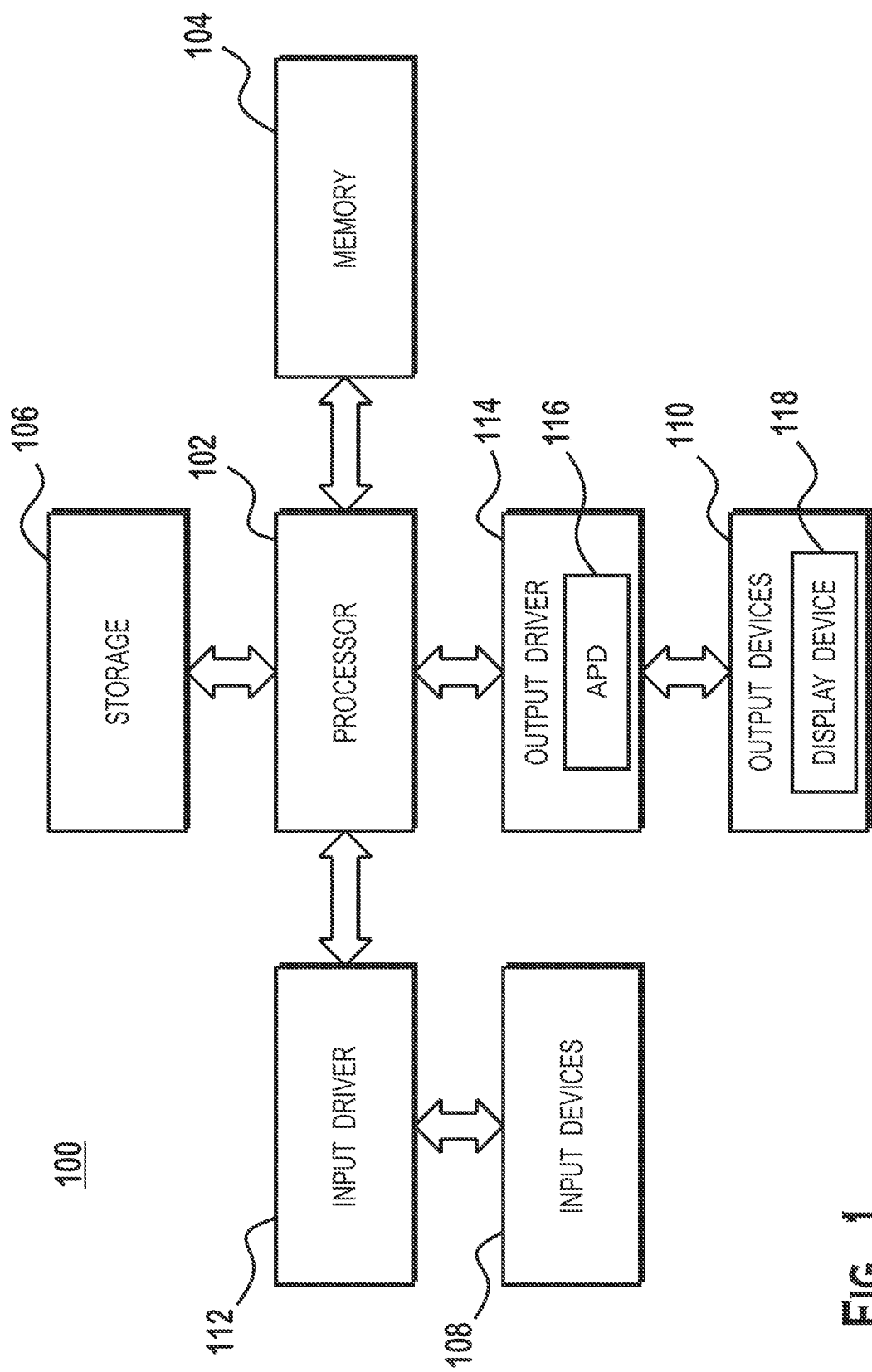
FIG. 1 is a block diagram of an example device in which one or more features of the disclosure can be implemented.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide (graphical) output to a display device 118. For example, it is contemplated that any processing system that performs processing tasks in accordance with a SIMD paradigm can be configured to perform the functionality described herein. Alternatively, it is contemplated that computing systems that do not perform processing tasks in accordance with a SIMD paradigm performs the functionality described herein.

Figure 2:
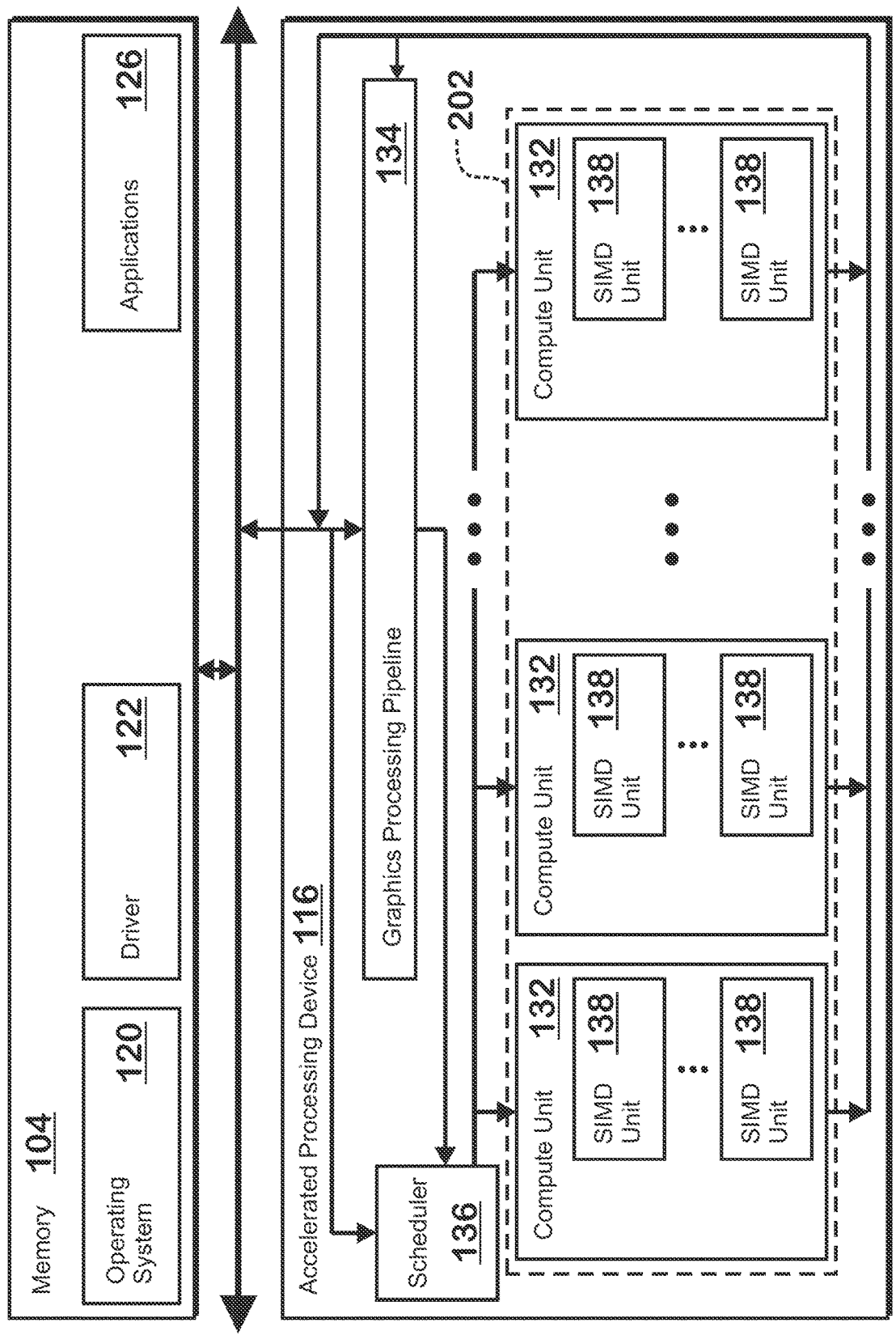
FIG. 2 is a block diagram of the device, illustrating additional details related to execution of processing tasks on the accelerated processing device of FIG. 1, according to an example.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 includes a just-in-time compiler that compiles programs for execution by processing components (such as the SIMD units 138 discussed in further detail below) of the APD 116. In other implementations, no just-in-time compiler is used to compile the programs, and a normal application compiler compiles shader programs for execution on the APD 116.

The APD 116 executes commands and programs for selected functions, such as graphics operations and non-graphics operations that are suited for parallel processing and/or non-ordered processing. The APD 116 is used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but executes that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 132 can have a local L1 cache. In an implementation, multiple compute units 132 share a L2 cache.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group is executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The compute units 132 implement ray tracing, which is a technique that renders a 3D scene by testing for intersection between simulated light rays and objects in a scene. Much of the work involved in ray tracing is performed by programmable shader programs, executed on the SIMD units 138 in the compute units 132, as described in additional detail below.

Figure 3:
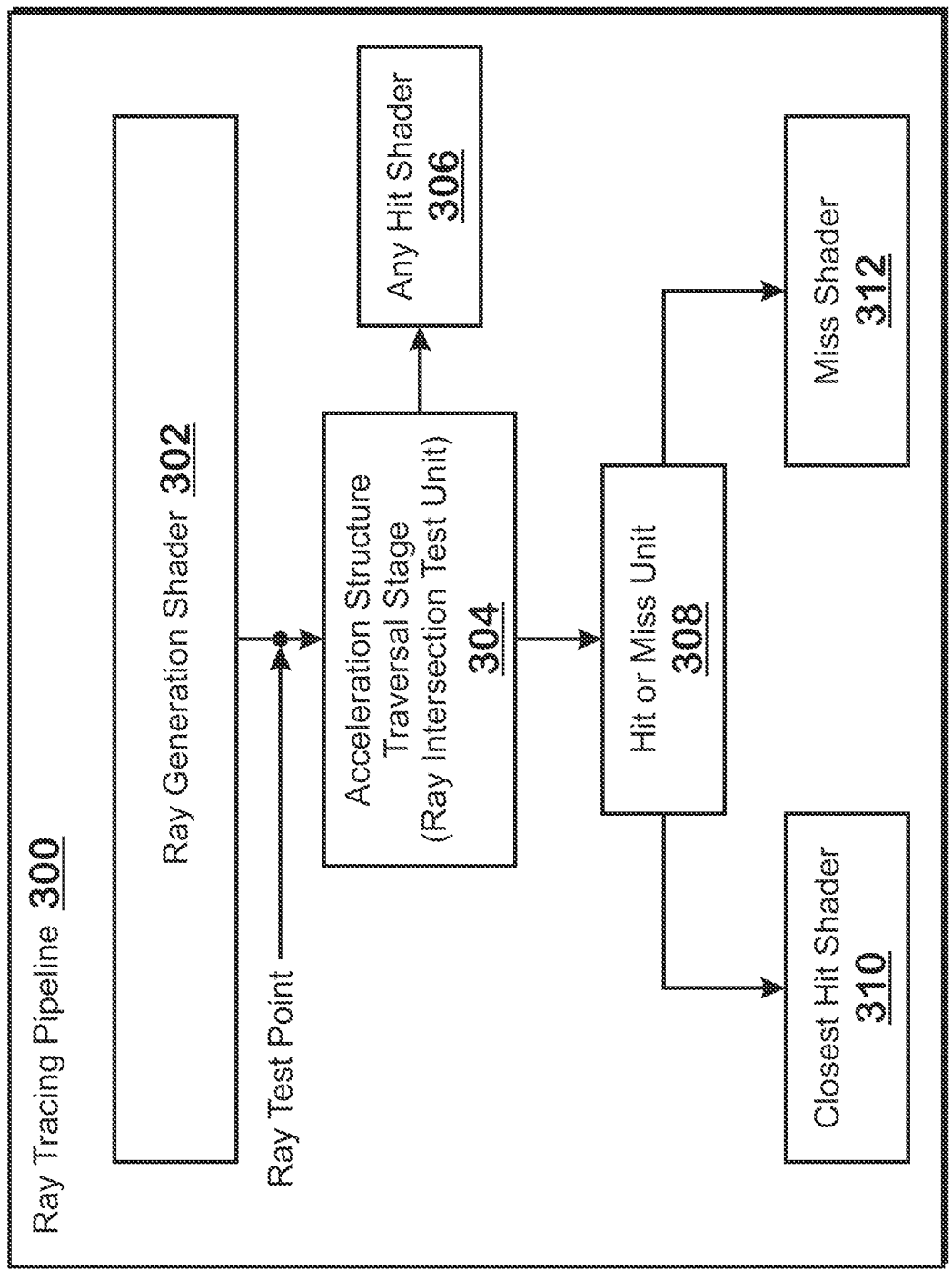
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. In some implementations, a ray generation shader 302, any hit shader 306, closest hit shader 310, and miss shader 312 are shader-implemented stages that represent ray tracing pipeline stages whose functionality is performed by shader programs executing in the SIMD unit 138. Any of the specific shader programs at each particular shader-implemented stage are defined by application-provided code (i.e., by code provided by an application developer that is pre-compiled by an application compiler and/or compiled by the driver 122). In other implementations, any of the ray generation shader 302, any hit shader 306, closest hit shader 310, and miss shader 312 are implemented as software executed on any type of processor and that performs the operations described herein, circuitry that performs the operations described herein, or a combination of hardware circuitry and software executing on a processor. The acceleration structure traversal stage 304 performs a ray intersection test to determine whether a ray hits a triangle.

The ray tracing pipeline 300 indicates the path through which a ray tracing operation flows. To render a scene using ray tracing, a rendering orchestrator, such as a program executing on the processor 102, designates a collection of geometry as a "scene." Various objects in the scene are represented as collections of geometry primitives, which are often triangles, but could be any geometric shape. The term "triangle" when used herein, refers to these geometric primitives that compose a scene. The rendering orchestrator renders the scene by designating a camera position and an image, and requesting rays be traced from the camera through the image. The ray tracing pipeline 300 performs the various operations described herein to determine colors for the rays. Colors are often derived from the triangles that are intersected by the rays. As described elsewhere herein, a ray that hits no triangle invokes a miss shader 312. One possible operation for the miss shader 312 is to color the ray with a color from the "skybox," which is an image that is designated as representing the ambient scene where no geometry is present (for example, a scene with no geometry would render only the skybox). Colors for pixels in the image are determined based on the point of intersection between the ray and the image position. In some examples, after a sufficient number of rays are traced and the pixels of the image have been designated colors, the image is displayed on a screen or is used in some other manner.

In some implementation where the shader stages of the ray tracing pipeline 300 are implemented in software, the various programmable shader stages (ray generation shader 302, any hit shader 306, closest hit shader 310, miss shader 312) are implemented as shader programs that execute on the SIMD units 138. The acceleration structure traversal stage 304 is implemented in software (e.g., as a shader program executing on the SIMD units 138), in hardware, or as a combination of hardware and software. The hit or miss unit 308 is implemented in any technically feasible manner, such as as part of any of the other units, implemented as a hardware accelerated structure, or implemented as a shader program executing on the SIMD units 138. The ray tracing pipeline 300 is, in various implementations, orchestrated partially or fully in software or partially or fully in hardware, and may be orchestrated by the processor 102, the scheduler 136, by a combination thereof, or partially or fully by any other hardware and/or software unit. In examples, traversal through the ray tracing pipeline 300 is performed partially or fully by the scheduler 136, either autonomously or under control of the processor 102, or partially or fully by a shader program (such as a bounding volume hierarchy traversal shader program) executing on one or more of the SIMD units 138. In some examples, testing a ray against boxes and triangles (inside the acceleration structure traversal stage 304) is hardware accelerated (meaning that a fixed function hardware unit performs the steps for those tests). In other examples, such testing is performed by software such as a shader program executing on one or more SIMD units 138. Herein, where the phrase "the ray tracing pipeline does [an action]" is used, this means that the hardware and/or software that implements the ray tracing pipeline 300 does that action. Although described as executing on the SIMD unit 138 of FIG. 3, it should be understood that in other implementations, other hardware, having or not having SIMD capabilities (e.g., the processor 102), alternatively executes the shader programs of the illustrated ray tracing pipeline 300.

The ray tracing pipeline 300 operates in the following manner. A ray generation shader 302 is performed. The ray generation shader 302 sets up data for a ray to test against a triangle and requests the acceleration structure traversal stage 304 test the ray for intersection with triangles.

The acceleration structure traversal stage 304 traverses an acceleration structure, which is a data structure that describes a scene volume and objects (such as triangles) within the scene, and tests the ray against triangles in the scene. In various examples, the acceleration structure is a bounding volume hierarchy. The hit or miss unit 308, which, in some implementations, is part of the acceleration structure traversal stage 304, determines whether the results of the acceleration structure traversal stage 304 (which may include raw data such as barycentric coordinates and a potential time to hit) actually indicates a hit. For triangles that are hit, the ray tracing pipeline 300 triggers execution of the any hit shader 306. Note that multiple triangles can be hit by a single ray. It is not guaranteed that the acceleration structure traversal stage will traverse the acceleration structure in the order from closest-to-ray-origin to farthest-from-ray-origin. The hit or miss unit 308 triggers execution of a closest hit shader 310 for the triangle closest to the origin of the ray that the ray hits, or, if no triangles were hit, triggers a miss shader.

Note, it is possible for the any hit shader 306 to "reject" a hit from the ray intersection test unit 304, and thus the hit or miss unit 308 triggers execution of the miss shader 312 if no hits are found or accepted by the ray intersection test unit 304. An example circumstance in which an any hit shader 306 may "reject" a hit is when at least a portion of a triangle that the ray intersection test unit 304 reports as being hit is fully transparent. Because the ray intersection test unit 304 only tests geometry, and not transparency, the any hit shader 306 that is invoked due to a hit on a triangle having at least some transparency may determine that the reported hit is actually not a hit due to "hitting" on a transparent portion of the triangle. A typical use for the closest hit shader 310 is to color a material based on a texture for the material. A typical use for the miss shader 312 is to color a pixel with a color set by a skybox. It should be understood that the closest hit shader 310 and miss shader 312 may implement a wide variety of techniques for coloring pixels and/or performing other operations. In instances in which these shaders are implemented as programmable shader stages executing shader programs, different shader programs used for the same application are capable of coloring pixels in different ways.

A typical way in which the ray generation shader 302 generates rays is with a technique referred to as backwards ray tracing. In backwards ray tracing, the ray generation shader 302 generates a ray having an origin at the point of the camera. The point at which the ray intersects a plane defined to correspond to the screen defines the pixel on the screen whose color the ray is being used to determine. If the ray hits an object, that pixel is colored based on the closest hit shader 310. If the ray does not hit an object, the pixel is colored based on the miss shader 312. Multiple rays may be cast per pixel, with the final color of the pixel being determined by some combination of the colors determined for each of the rays of the pixel. As described elsewhere herein, it is possible for individual rays to generate multiple samples, which each sample indicating whether the ray hits a triangle or does not hit a triangle. In an example, a ray is cast with four samples. Two such samples hit a triangle and two do not. The triangle color thus contributes only partially (for example, 50%) to the final color of the pixel, with the other portion of the color being determined based on the triangles hit by the other samples, or, if no triangles are hit, then by a miss shader. In some examples, rendering a scene involves casting at least one ray for each of a plurality of pixels of an image to obtain colors for each pixel. In some examples, multiple rays are cast for each pixel to obtain multiple colors per pixel for a multi-sample render target. In some such examples, at some later time, the multi-sample render target is compressed through color blending to obtain a single-sample image for display or further processing. While it is possible to obtain multiple samples per pixel by casting multiple rays per pixel, techniques are provided herein for obtaining multiple samples per ray so that multiple samples are obtained per pixel by casting only one ray. It is possible to perform such a task multiple times to obtain additional samples per pixel. More specifically, it is possible to cast multiple rays per pixel and to obtain multiple samples per ray such that the total number of samples obtained per pixel is the number of samples per ray multiplied by the number of rays per pixel.

It is possible for any of the any hit shader 306, closest hit shader 310, and miss shader 312, to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color to the pixel corresponding to the closest hit shader 310. It should be understood that although some examples of ways in which the various components of the ray tracing pipeline 300 can be used to render a scene have been described, any of a wide variety of techniques may alternatively be used.

As described above, the determination of whether a ray hits an object is referred to herein as a "ray intersection test." The ray intersection test involves shooting a ray from an origin and determining whether the ray hits a triangle and, if so, what distance from the origin the triangle hit is at. For efficiency, the ray tracing test uses a representation of space referred to as a bounding volume hierarchy. This bounding volume hierarchy is the "acceleration structure" described above. In a bounding volume hierarchy, each non-leaf node represents an axis aligned bounding box that bounds the geometry of all children of that node. In an example, the base node represents the maximal extents of an entire region for which the ray intersection test is being performed. In this example, the base node has two children that each represent mutually exclusive axis aligned bounding boxes that subdivide the entire region. Each of those two children has two child nodes that represent axis aligned bounding boxes that subdivide the space of their parents, and so on. Leaf nodes represent a triangle against which a ray test can be performed.

The bounding volume hierarchy data structure allows the number of ray-triangle intersections (which are complex and thus expensive in terms of processing resources) to be reduced as compared with a scenario in which no such data structure were used and therefore all triangles in a scene would have to be tested against the ray. Specifically, if a ray does not intersect a particular bounding box, and that bounding box bounds a large number of triangles, then all triangles in that box can be eliminated from the test. Thus, a ray intersection test is performed as a sequence of tests of the ray against axis-aligned bounding boxes, followed by tests against triangles.

Figure 4:
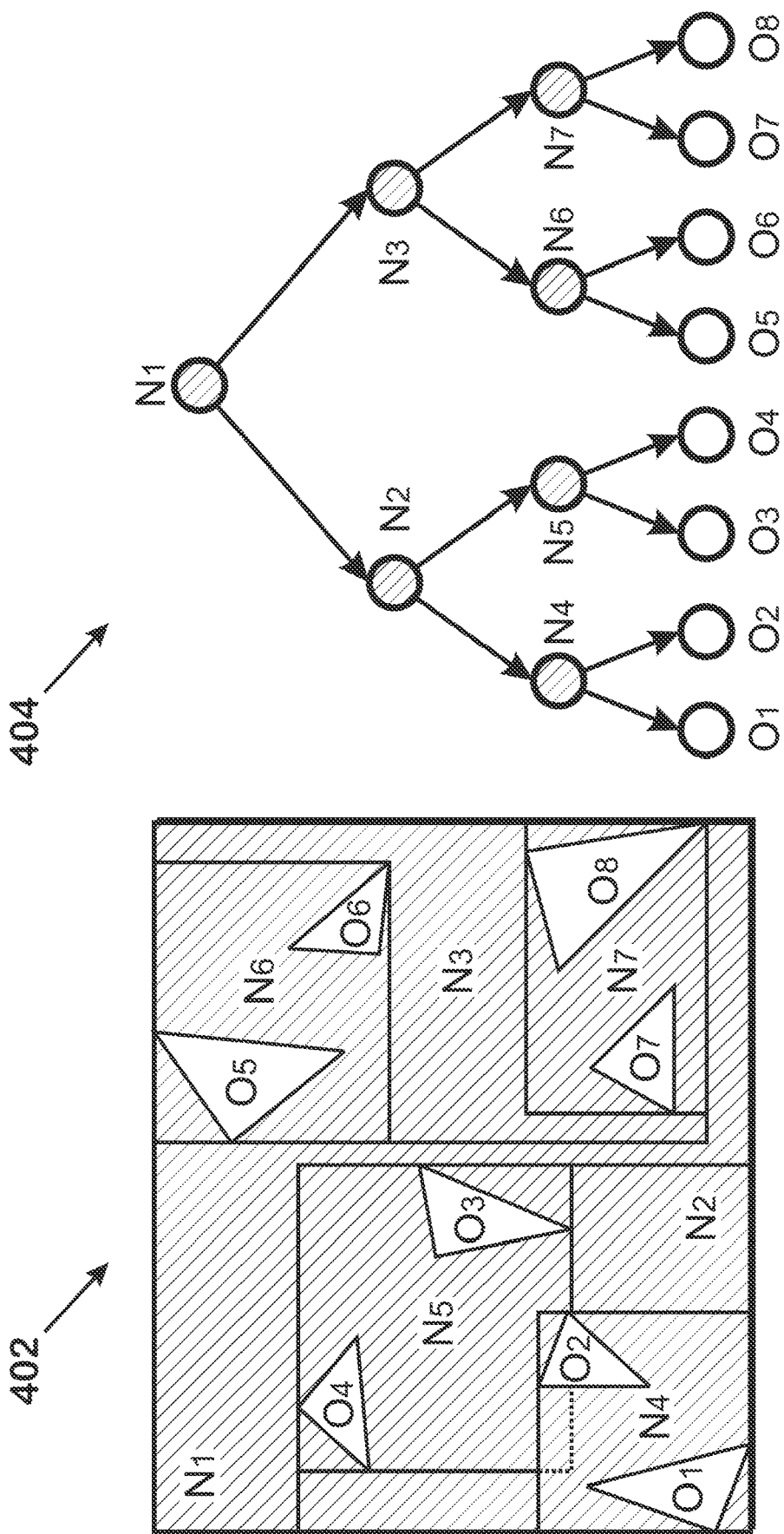
FIG. 4 is an illustration of a bounding volume hierarchy, according to an example.

FIG. 4 is an illustration of a bounding volume hierarchy, according to an example. For simplicity, the hierarchy is shown in 2D. However, extension to 3D is simple, and it should be understood that the tests described herein would generally be performed in three dimensions.

The spatial representation 402 of the bounding volume hierarchy is illustrated in the left side of FIG. 4 and the tree representation 404 of the bounding volume hierarchy is illustrated in the right side of FIG. 4. The non-leaf nodes are represented with the letter "N" and the leaf nodes are represented with the letter "O" in both the spatial representation 402 and the tree representation 404. A ray intersection test would be performed by traversing through the tree 404, and, for each non-leaf node tested, eliminating branches below that node if the box test for that non-leaf node fails. For leaf nodes that are not eliminated, a ray-triangle intersection test is performed to determine whether the ray intersects the triangle at that leaf node. For non-leaf nodes that are not eliminated, the ray intersection test would intersect the ray with such non-eliminated nodes, to determine whether children of such nodes should be eliminated from consideration. For leaf nodes or non-leaf nodes that are eliminated, the ray intersection test does not perform an intersection test of the ray with such nodes. In sum, to perform an intersection test for a ray, the ray racing pipeline 300 begins with one or more starting non-leaf nodes and tests one or more of those non-leaf nodes for intersection with the ray. The ray tracing pipeline 300 follows the edges of the bounding volume hierarchy, testing non-leaf nodes against the ray to either eliminate or not eliminate children of those nodes. For leaf nodes encountered by the ray tracing pipeline 300, the ray tracing pipeline 300 tests the ray against such nodes to determine whether the ray intersects the geometry associated with such leaf nodes.

In an example, the ray intersects $O_5$ but no other triangle. The test would test against $N_1$, determining that that test succeeds. The test would test against $N_2$, determining that the test fails (since $O_5$ is not within $N_1$). The test would eliminate all sub-nodes of $N_2$ and would test against $N_3$, noting that that test succeeds. The test would test $N_6$ and $N_7$, noting that $N_6$ succeeds but $N_7$ fails. The test would test $O_5$ and $O_6$, noting that $O_5$ succeeds but $O_6$ fails. Instead of testing 8 triangle tests, two triangle tests ($O_5$ and $O_6$) and five box tests ($N_1$, $N_2$, $N_3$, $N_6$, and $N_7$) are performed.

As described herein, non-leaf nodes are associated with bounding boxes that bound the geometry of the children of those non-leaf nodes. Leaf nodes are associated with geometry of the scene against which rays are tested. A variety of geometry types may exist. Some example geometry types for leaf nodes are triangles and procedural geometry, although this is not an exhaustive list. Procedural geometry is geometry whose intersection with a ray is defined procedurally, rather than as data. More specifically, procedural geometry is associated with leaf nodes, and represents the geometry that a ray is tested against to determine whether a ray hits the geometry of such leaf nodes. In the process of traversing a bounding volume hierarchy, in response to the ray tracing pipeline 300 encountering a leaf node that has associated procedural geometry, the ray tracing pipeline 300 triggers execution of a procedure, such as one specified in a shader program (or through other means), to determine whether the ray intersects that procedural geometry. Thus the test for intersection with a procedure is defined procedurally.

Figure 5:
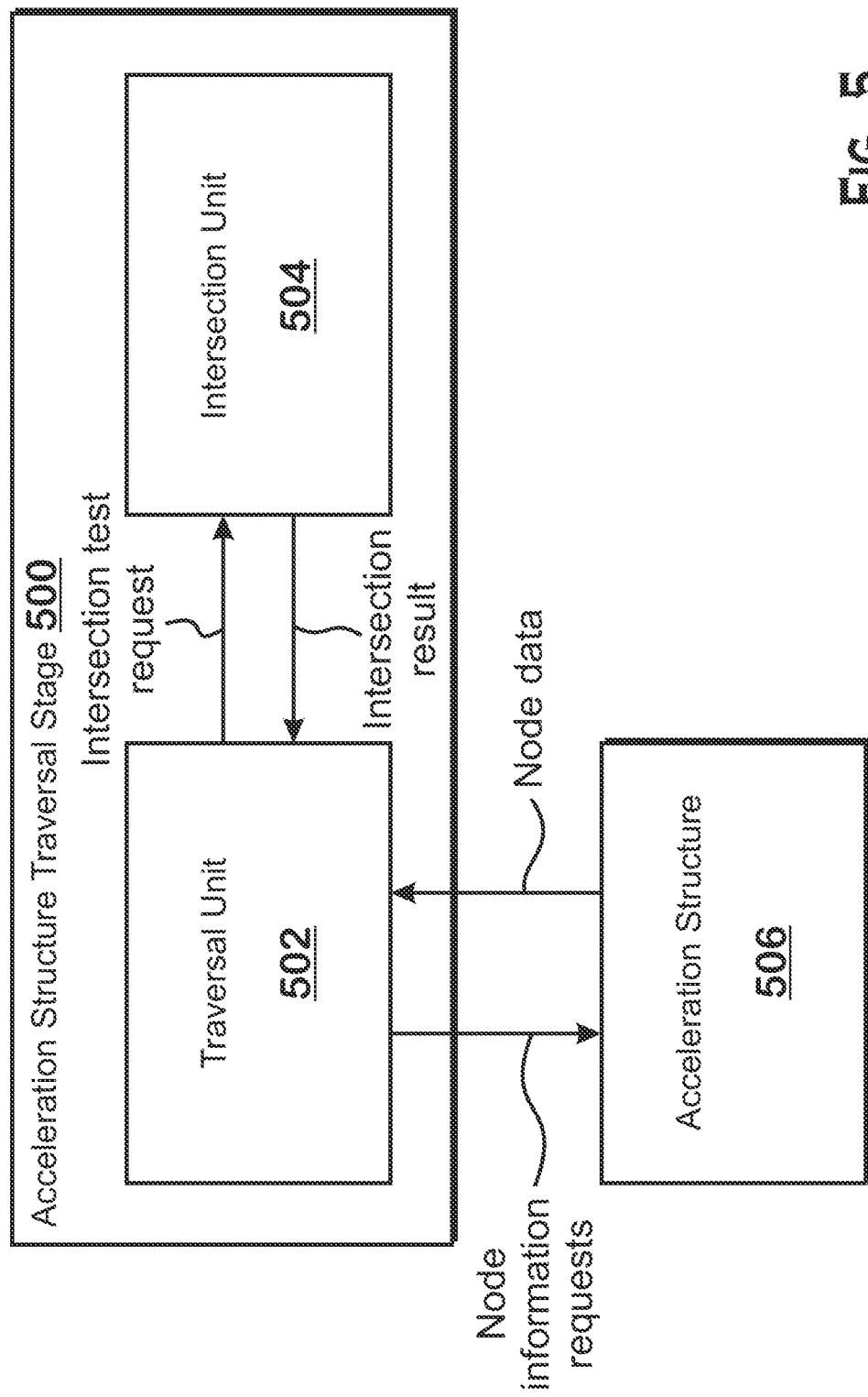
FIG. 5 is a block diagram of an acceleration structure traversal stage, according to an example.

FIG. 5 is a block diagram of an acceleration structure traversal stage 500, according to an example. In some implementations, the acceleration structure traversal stage 304 of FIG. 3 is the acceleration structure traversal stage 500 of FIG. 5.

The acceleration structure traversal stage 500 includes a traversal unit 502 and an intersection unit 504. The traversal unit 502 accepts a request to test a ray for intersection with geometry in a scene. The traversal unit 502 traverses the nodes of the acceleration structure 506, requesting and obtaining node data from the acceleration structure 506, and requests intersection tests be performed be the intersection unit 504. The intersection unit 504 performs the requested intersection tests for the traversal unit 502 and returns the results of the intersection tests to the traversal unit 502.

In an example, the traversal unit 502 receives a ray to test for intersection with the geometry of the scene represented by the acceleration structure 506. The traversal unit 502 reads a first non-leaf node (in an example, $N_2$ from bounding volume hierarchy 404 of FIG. 4) from the acceleration structure 506 and requests that the intersection unit 504 test the ray against the geometry of that node. The intersection unit 504 performs that test and returns the test result to the traversal unit. The result indicates that the ray does not intersect the box and therefore eliminates children of the non-leaf node from consideration. Subsequently, the traversal unit 502 reads another non-leaf node (in an example, $N_3$) from the acceleration structure 506 and requests that the intersection unit 504 test the ray against the geometry of that node. The intersection unit 504 performs that test and returns the test result to the traversal unit 502. The test result indicates that the ray intersects the box associated with that node and therefore the traversal unit 502 continues with testing the children of that non-leaf node (in the example, nodes $N_6$ and $N_7$).

In various implementations, the traversal unit 502 and intersection unit 504 are implemented as software executing on a programmable processor, hard-wired circuitry, or a combination thereof. In one example implementation, the traversal unit 502 is a shader program (a "traversal shader program") executing on one or more compute units 132. The intersection unit 504 is dedicated hardware circuitry configured to perform intersection tests, such as ray-triangle and ray-box intersection tests. The traversal shader program executes instructions of an instruction set architecture which includes at least one instruction to request that the intersection unit 504 perform an intersection test for the ray. In some implementations, for procedural geometry, the traversal shader program triggers execution of a set of instructions for testing the ray against procedural geometry. In other implementations, the traversal unit 502 is a hard-wired circuitry unit that performs the operations described herein.

In some situations, a cull-requesting entity such as an application, or any of the shader programs or hardware units described herein, requests that certain types of geometry be culled from a scene. Culling means that even though the geometry is present in a scene, the geometry is not rendered. Regarding a bounding volume hierarchy, geometry that would be culled is geometry specified by (or associated with) the leaf nodes. During a ray-intersection test for a ray, which involves traversal of the bounding volume hierarchy and testing the ray against the nodes of the bounding volume hierarchy, the traversal unit 502 considers geometry that is to be culled as not intersected by the ray.

In various situations, more than one culling entity requests that particular geometry types are culled. In these situations, the ray tracing pipeline 300 culls geometry of all of the requested types. In some implementations, types of geometry that could be culled include opaque geometry, non-opaque geometry, triangles, or procedural geometry.

During a ray intersection test, it is possible to cull particular leaf node geometry by noting that that geometry is of a type that a cull-requesting entity has requested to be culled and, in response, determining that the ray does not intersect that geometry without performing an intersection test of the ray against that geometry. More specifically, the ray tracing pipeline 300 determines that geometry that is culled should not be rendered. Similarly, if a ray does not intersect geometry, then that geometry is not rendered. Therefore, a determination that geometry is culled has the same effect as a determination that the geometry is not intersected by a ray.

In addition, in certain situations, it is possible to cull a non-leaf node based on a determination that all descendants of the non-leaf node have a type that one or more cull-requesting entities have requested to be culled. In an example, all of the children of a box node are opaque and a cull-requesting entity has requested that opaque geometry be culled. In such a situation, it is possible to cull such a non-leaf node by treating the non-leaf node as non-intersected, without performing an actual intersection test, or even if such an intersection test determines that the ray does intersect the non-leaf node.

Figure 6A:
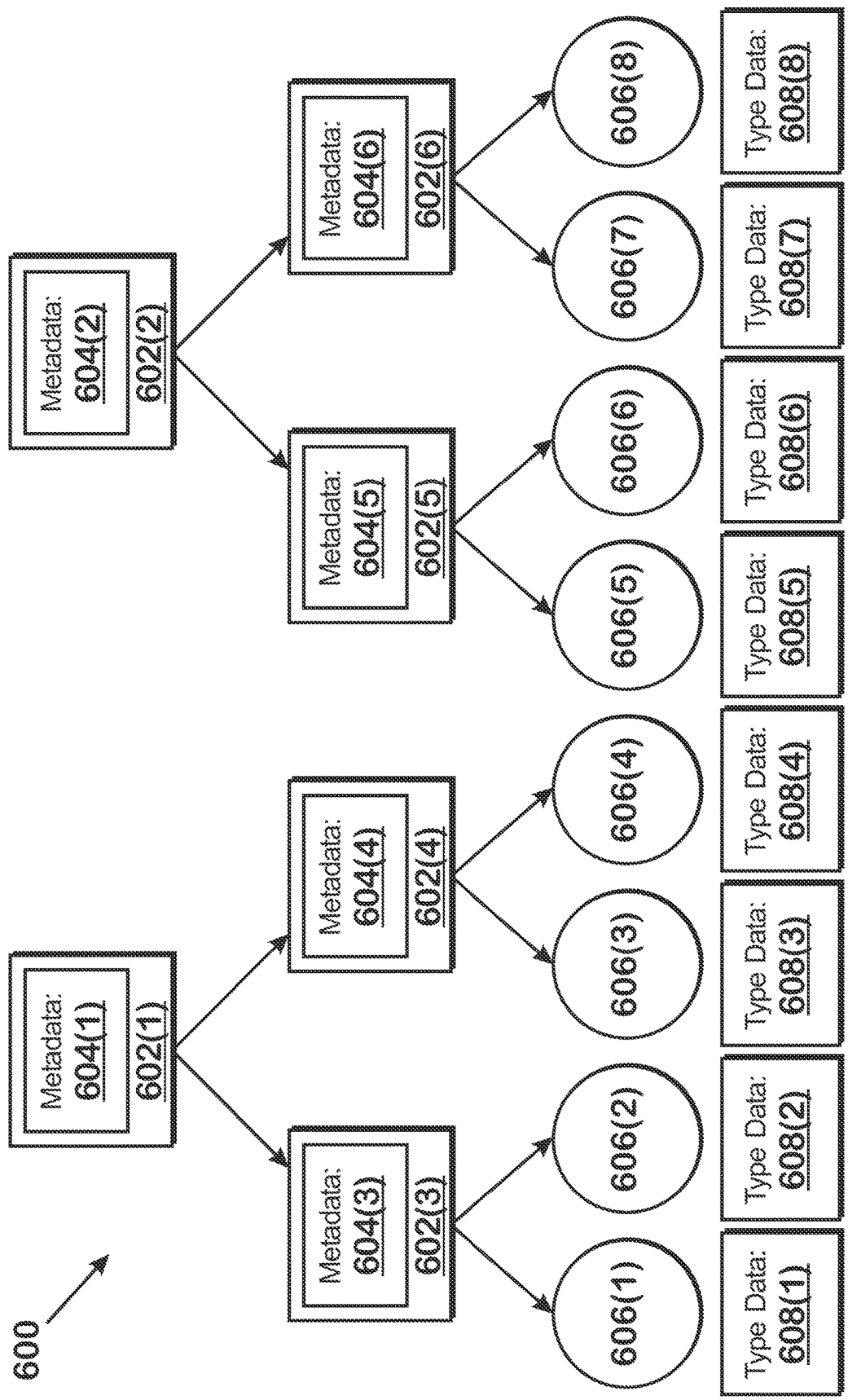
FIG. 6A is a block diagram of a bounding volume hierarchy that includes type metadata in non-leaf nodes to permit early culling of bounding volume hierarchy nodes, according to an example.

FIG. 6A is a block diagram of a bounding volume hierarchy 600 that includes type metadata in non-leaf nodes to permit early culling of bounding volume hierarchy nodes, according to an example. The bounding volume hierarchy 600 includes non-leaf nodes 602, and leaf nodes 606. The non-leaf nodes 602 include child type metadata 604 and the leaf nodes 606 are associated with leaf node type data 608.

The leaf node type data 608 indicates the type of the associated leaf node 606. As described elsewhere herein, in some implementations, types include aspects such as what geometry the leaf node is (e.g., triangle or procedural), and whether the leaf node is opaque or non-opaque. Any other leaf node types are possible. In one example, a leaf node includes arbitrary application-defined masking information. In an example, such masking information defines different layers in a rendering such as foreground and background objects. In such an example, nodes are either background or foreground, and the types include either background or foreground. Other similarly application-defined type information could be used.

The child type metadata 604 associated with the non-leaf nodes 602 indicates whether each leaf node descendant of a non-leaf node 602 has a particular leaf node type. More specifically, child type metadata 604 for a given non-leaf node 602 indicates, for one or more leaf node types, whether each leaf node descendant of that given non-leaf node 602 has that leaf node type. A first node is a descendant of a second node in either the situation that the first node is the child of the second node or in the situation that the first node is a child of a descendant of the second node.

Referring to FIGS. 5 and 6A together, in operation, the acceleration structure traversal stage 500 traverses through a bounding volume hierarchy (such as, but not limited to, bounding volume hierarchy 600) in response to a request to test a ray for intersections in the following manner. The traversal unit 502 obtains information indicating which one or more leaf node types are to be culled. In an example, such information includes whether to cull triangles, whether to cull procedural geometry, whether to cull opaque geometry, or whether to cull non-opaque geometry.

In response to receiving the information regarding which one or more leaf node types are to be culled, and the ray to be tested for intersection, the traversal unit 502 traverses the bounding volume hierarchy. The traversal unit 502 provides the information regarding which leaf node types are to be culled to the intersection unit 504. The traversal unit 502 traverses the bounding volume hierarchy, starting with certain nodes (such as the top-most nodes) under consideration. For any particular node under consideration, the traversal unit 502 transmits a request to test the ray or intersection with that node to the intersection unit 504, which performs a test and returns a result to the traversal unit 502. For a non-leaf node 602, if the result from the intersection unit 504 indicates that the ray does not intersect the non-leaf node 602, then the traversal unit 502 does not consider any child of that non-leaf node 602 (where "consider" means test for intersection with the ray). If the intersection unit 504 indicates that the ray does intersect the non-leaf node 602, then the traversal unit 502 is permitted to (and in certain situations does) consider the children of that non-leaf node 602. Note, it is possible for the intersection unit 504 to not consider such children for other reasons, such as terminating traversal of the bounding volume hierarchy early. For leaf nodes 606, the result of the intersection test is utilized for rendering purposes in any technically feasible manner, such as by determining a color for a pixel or by determining a lighting contribution for a pixel.

For non-leaf nodes 602 that have metadata 604 that matches at least one type for which culling is to occur, the intersection unit 504 returns the result that the ray does not intersect that non-leaf node 602, even if geometrically, the ray actually does intersect that non-leaf node 602. More specifically, if the metadata 604 indicates that all leaf node descendants of a non-leaf node 602 have a certain type, and culling is to occur for leaf nodes of that particular type, then the intersection unit 504 indicates to the traversal unit 502 that no intersection of that non-leaf node 602 occurs. This operation occurs because there is no reason to consider any descendants of a non-leaf node 602 where all descendants of that non-leaf node 602 are to be culled.

Although it is stated above that the intersection unit 504 receives information regarding which leaf node types to cull and reports an intersection test result to the traversal unit 502 based on that information, in other implementations, the traversal unit 502 does not provide such information to the intersection unit 504. In such implementations, the traversal unit 502 examines the metadata 604 for a non-leaf node 602 to determine whether the non-leaf node 602 should be treated as not intersected by the ray. In some implementations, the traversal unit 502 and the intersection unit 504 are the same entity.

Note that no specific order for traversal of the bounding volume hierarchy 600 has been described. This is because it is possible to traverse the bounding volume hierarchy 600 in any technically feasible order. The acceleration structure simply assists with eliminating particular nodes of the bounding volume hierarchy via tests against non-leaf node 602.

Figure 6B:
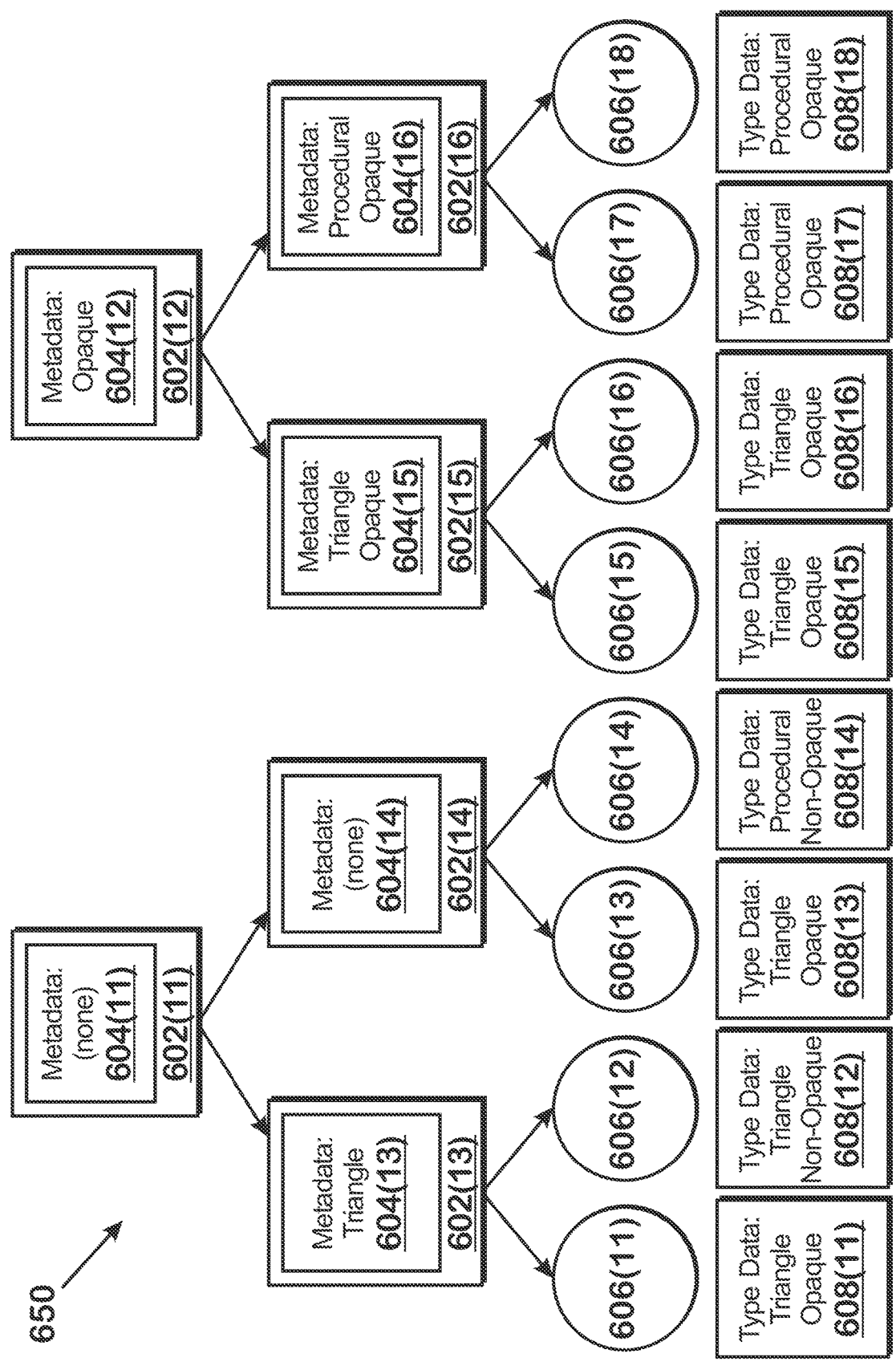
FIG. 6B illustrates an example bounding volume hierarchy, including type metadata in non-leaf nodes.

FIG. 6B illustrates an example bounding volume hierarchy 650, including type metadata 604 in non-leaf nodes 602. The metadata and type data illustrated are for illustrative purposes only and should not be taken to be limiting. Metadata of "(none)" for a non-leaf node 602 indicates that there is no triangle type, of the triangle types available, that is shared among all descendant leaf nodes 606 of the non-leaf node 602.

In this example, there are eight leaf nodes 606: 606(11) through 606(18). Leaf node 606(11) has type data 608(11) of triangle and opaque. Leaf node 606(12) has type data 608(12) of triangle and non-opaque. Leaf node 606(13) has type data 608(13) of triangle and opaque. Leaf node 606(14) has type data 608(14) o procedural and non-opaque. Leaf node 606(15) has type data 608(15) of triangle and opaque. Leaf node 606(16) has type data 608(16) of triangle and opaque. Leaf node 606(17) has type data 608(17) of procedural and opaque. Leaf node 606(18) has type data 608(18) of procedural and opaque.

Non-leaf node 602(13) includes metadata 604(13) that indicates that each descendant of non-leaf node 602(13) shares the "triangle" type. Because these descendants do not share the "opaque" or "non-opaque" type, that information is not included in metadata 604(13). Non-leaf node 602(14) includes metadata 604(14) that indicates that no type data is shared among all descendants of non-leaf node 602(14). Non-leaf node 602(15) includes metadata 604(15) that indicates that each leaf node descendant of non-leaf node 602(15) has "triangle" and "opaque" type data 608. Non-leaf node 602(16) includes metadata 604(16) that indicates that each leaf node descendant of non-leaf node 602(16) has "procedural" and "opaque" type data. Non-leaf node 602(11) includes metadata 604(11) that indicates that there is no leaf node type shared among all leaf node descendants of non-leaf node 602(11). Non-leaf node 602(12) includes metadata 604(12) that indicates that all leaf node descendants of non-leaf node 602(12) have leaf node type of "opaque."

In one example, in operation, the acceleration structure traversal stage 500 is to cull triangles. In such example, the acceleration structure traversal stage 500 would not perform ray intersection tests for any of the descendants of non-leaf node 602(13) or non-leaf node 602(15). In another example, the acceleration structure traversal stage 500 is to cull opaque geometry. In such example, the acceleration structure traversal stage 500 would not perform ray intersection tests for any of the descendants of non-leaf node 602(12). In yet another example, the acceleration structure traversal stage 500 is to cull opaque geometry and triangles. In such example, the acceleration structure traversal stage 500 would not perform ray intersection tests for any of the descendants of non-leaf node 602(12) or non-leaf node 602(13).

Figure 7:
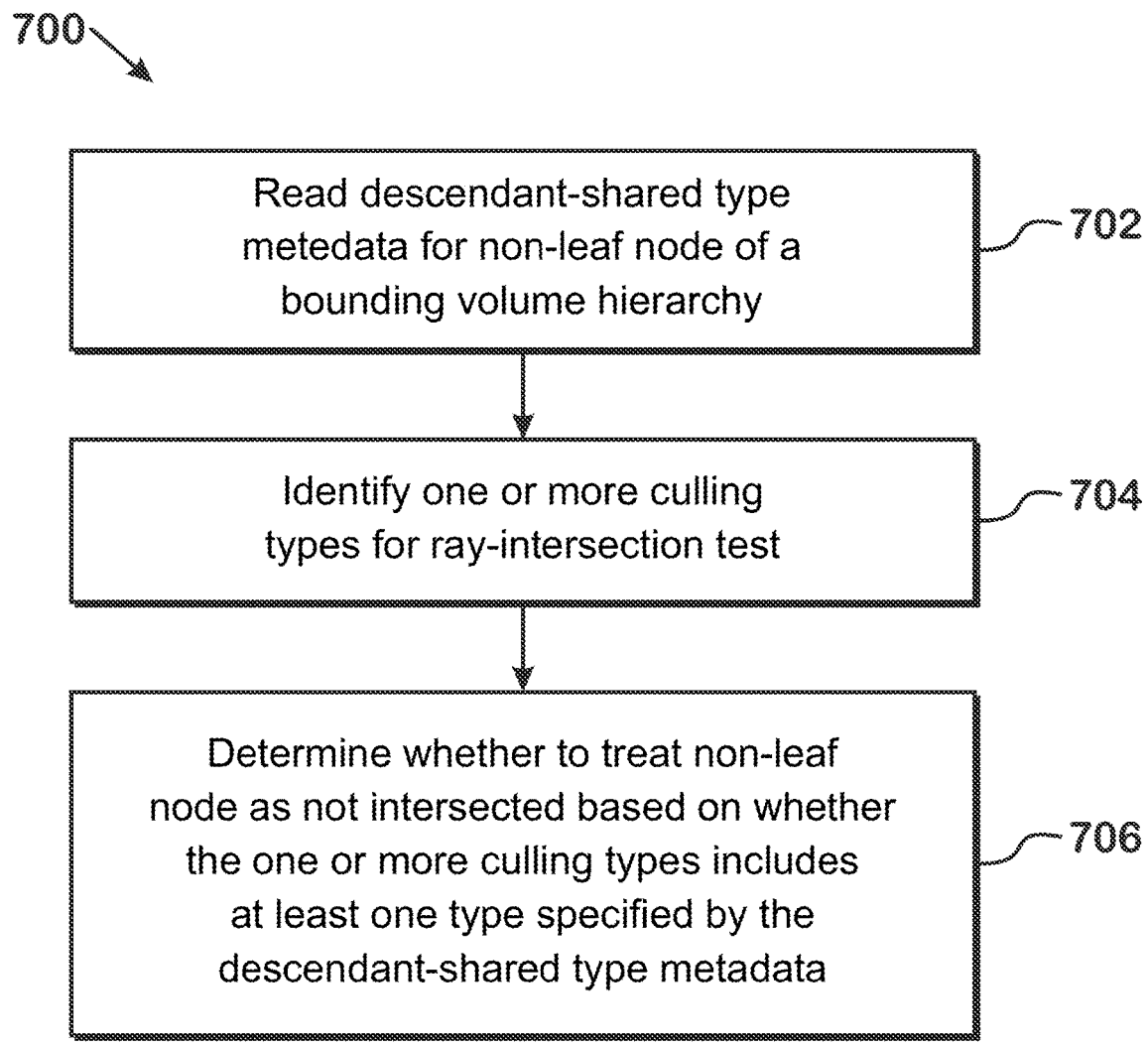
FIG. 7 is a flow diagram of a method for performing ray tracing operations, according to an example.

FIG. 7 is a flow diagram of a method 700 for performing ray tracing operations, according to an example. Although described with respect to the system of FIGS. 1-6B, those of skill in the art will understand that any system, configured to perform the steps of the method 700 in any technically feasible order, falls within the scope of the present disclosure.

The method 700 describes steps for considering a particular non-leaf node 602 and is used during traversal of a bounding volume hierarchy. Thus the method 700 begins where an acceleration structure traversal stage 500 is considering a single non-leaf node 602 of a bounding volume hierarchy.

At step 702, the acceleration structure traversal stage 500 reads descendant-shared type metadata 604 for a non-leaf node 602. In various examples, this metadata 604 is stored in the same data structure as the other information for the bounding volume hierarchy or is stored separately, as "sideband" information. The metadata indicates whether any particular leaf node type is shared among all leaf node descendants of the non-leaf node 602, and if so, what leaf node types are shared.

At step 704, the acceleration structure traversal stage 500 determines one or more culling types for a ray-intersection test. More specifically, the acceleration structure traversal stage 500 obtains information about what types of leaf nodes to cull, for example, from an application, shader program, or hardware unit. In some examples, this information is obtained before the acceleration structure traversal stage 500 begins traversing the bounding volume hierarchy.

At step 706, the acceleration structure traversal stage 500 determines whether to treat the non-leaf node as not intersected based on whether the one or more culling types includes at least one type of the descendant-shared type metadata. In the case that the metadata 604 includes at least one type that is to be culled, the acceleration structure traversal stage 500 determines that no children of the non-leaf node 602 should be traversed to. In some implementations, the acceleration structure traversal stage 500 treats the non-leaf node 602 as non-intersected by the ray, even if the geometry of the ray actually intersects the geometry associated with the non-leaf node 602. In the case that the metadata 604 includes no types that are to be culled, the acceleration structure traversal stage 500 performs a normal ray-box intersection test, proceeding with the acceleration structure traversal as normal (for instance, considering child nodes of the non-leaf node 602 if the intersection test determines that the ray intersects the non-leaf node 602, or eliminating those child nodes from consideration if the intersection test determines that the ray does not intersect the non-leaf node 602).

Each of the units illustrated in the figures represent hardware circuitry configured to perform the operations described herein, software configured to perform the operations described herein, or a combination of software and hardware configured to perform the steps described herein. For example, the acceleration structure traversal stage 304 is implemented fully in hardware, fully in software executing on processing units (such as compute units 132), or as a combination thereof. In some examples, the acceleration structure traversal stage 304 is partially implemented as hardware and partially as software. In some examples, the portion of the acceleration structure traversal stage 304 that traverses the bounding volume hierarchy is software executing on a processor and the portion of the acceleration structure traversal stage 304 that performs the ray-box intersection tests and ray-triangle intersection tests is implemented in hardware. In addition, any of the stages of the ray tracing pipeline 300 are, in various implementations, implemented as hardware circuitry, software executing on a processor, or a combination thereof. In addition, any of the units of FIG. 1 or 2 are, in various implementations, implemented as hardware circuitry, software executing on a processor, or a combination thereof. Where a particular stage of the ray tracing pipeline 300 is said to be "invoked," this invocation involves performing the functionality of the hardware if the stage is implemented as hardware circuitry or executing a shader program (or other software) if the stage is implemented as a shader program that executes on a processor.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing ray tracing operations, the method comprising:
   reading descendant-shared type metadata for a non-leaf node of a bounding volume hierarchy, wherein the descendant-shared type metadata includes type information other than geometry defining a bounding box for the non-leaf node, wherein the type information is common among all descendant leaf nodes of the non-leaf node;
   identifying one or more culling types for a ray-intersection test for a ray; and
   determining whether to treat the non-leaf node as not intersected based on whether the one or more culling types includes at least one type specified by the descendant-shared type metadata.

2. The method of claim 1, wherein:
   the one or more culling types includes at least one type specified by the descendant-shared type metadata; and
   determining whether to treat the non-leaf node as not intersected comprises determining to treat the non-leaf node as not intersected.

3. The method of claim 1, wherein:
   the one or more culling types includes no types specified by the descendant-shared type metadata; and
   determining whether to treat the non-leaf node as not intersected comprises not determining to treat the non-leaf node as not intersected.

4. The method of claim 1, wherein:
   the one or more culling types include one or more of triangle, procedural geometry, opaque geometry, and non-opaque geometry.

5. The method of claim 1, wherein:
   treating the non-leaf node as not intersected comprises generating an indication that the non-leaf node is not intersected by the ray.

6. The method of claim 5, further comprising:
   transmitting the indication to a traversal unit in response to the traversal unit requesting the ray be tested for intersection against the non-leaf node.

7. The method of claim 6, wherein the traversal unit is configured to execute a traversal shader program that requests the ray be tested for intersection against the non-leaf node as part of the ray-intersection test.

8. The method of claim 1, further comprising:
   performing the reading, identifying, and determining steps for multiple nodes of the bounding volume hierarchy during traversal of the bounding volume hierarchy.

9. The method of claim 8, further comprising:
   for intersection tests of the ray against non-leaf nodes for which it is determined that the ray does not intersect the non-leaf node, foregoing considering children of that non-leaf node.

10. A system, comprising:
    an acceleration structure traversal stage configured to:
      read descendant-shared type metadata for a non-leaf node of a bounding volume hierarchy, wherein the descendant-shared type metadata includes type information other than geometry defining a bounding box for the non-leaf node, wherein the type information is common among all descendant leaf nodes of the non-leaf node,
      identify one or more culling types for a ray-intersection test for a ray, and
      determine whether to treat the non-leaf node as not intersected based on whether the one or more culling types includes at least one type specified by the descendant-shared type metadata; and a memory configured to store at least a part of the bounding volume hierarchy.

11. The system of claim 10, wherein:

the one or more culling types includes at least one type specified by the descendant-shared type metadata; and determining whether to treat the non-leaf node as not intersected comprises determining to treat the non-leaf node as not intersected.

12. The system of claim 10, wherein:

the one or more culling types includes no types specified by the descendant-shared type metadata; and determining whether to treat the non-leaf node as not intersected comprises not determining to treat the non-leaf node as not intersected.

13. The system of claim 10, wherein:

the one or more culling types include one or more of triangle, procedural geometry, opaque geometry, and non-opaque geometry.

14. The system of claim 10, wherein:

treating the non-leaf node as not intersected comprises generating an indication that the non-leaf node is not intersected by the ray.

15. The system of claim 14, wherein the acceleration structure traversal stage is further configured to:

transmit the indication to a traversal unit in response to the traversal unit requesting the ray be tested for intersection against the non-leaf node.

16. The system of claim 15, wherein the traversal unit is configured to execute a traversal shader program that requests the ray be tested for intersection against the non-leaf node as part of the ray-intersection test.

17. The system of claim 10, wherein the acceleration structure traversal stage is further configured to:

perform the reading, identifying, and determining steps for multiple nodes of the bounding volume hierarchy during traversal of the bounding volume hierarchy.

18. The system of claim 17, wherein the acceleration structure traversal stage is further configured to:

for intersection tests of the ray against non-leaf nodes for which it is determined that the ray does not intersect the non-leaf node, forego considering children of that non-leaf node.

19. A non-transitory computer-readable medium storing instructions that, when executed by a processor, causes the processor to:

read descendant-shared type metadata for a non-leaf node of a bounding volume hierarchy, wherein the descendant-shared type metadata includes type information other than geometry defining a bounding box for the non-leaf node, wherein the type information is common among all descendant leaf nodes of the non-leaf node;

identify one or more culling types for a ray-intersection test for a ray; and determine whether to treat the non-leaf node as not intersected based on whether the one or more culling types includes at least one type specified by the descendant-shared type metadata.

20. The non-transitory computer-readable medium of claim 19, wherein:

the one or more culling types includes at least one type specified by the descendant-shared type metadata; and the determination of whether to treat the non-leaf node as not intersected comprises determining to treat the non-leaf node as not intersected.

* * * * *